2,944,992
Patented July 12, 1960

2,944,992

VINYLPYRIDINE POLYMER ADHESIVE COMPOSITION CONTAINING BORIC OXIDE AND A HETERO-NITROGEN COMPOUND AS A STABILIZER

Gerard Kraus, Bartlesville, Okla., assignor to Phillips Petroleum Company, a corporation of Delaware No Drawing. Filed Nov. 1, 1957, Ser. No. 693,798

8 Claims. (Cl. 260—32.6)

This invention relates to stabilized adhesive cement compositions. In a more specific aspect, the invention relates to fluid adhesive cement compositions comprising boric oxide dispersed in a polymer of a heterocyclic nitrogen base and containing certain heterocyclic nitrogen compounds as stabilizers.

It is known that good adhesive compositions can be made from either liquid or rubbery polymers of heterocyclic nitrogen bases by incorporating boric oxide therein. The use of boric oxide improves the adhesiveness of such polymers. In some applications, the boric oxide is mixed with a solid polymer of the heterocyclic nitrogen base on a mill along with any other compounding ingredients. Such an intimate admixture can be used, for example, in the form of sheets having the desired dimensions. In a number of other applications, however, it is desirable to employ a liquid cement. Such liquid cements can be made by mixing a liquid polymer of a heterocyclic nitrogen base with boric oxide and any other desired curatives; or it can be made by mixing a solid, semisolid or even a liquid polymer of the heterocyclic nitrogen base with a solvent for the polymer and with boric acid and other desired curvatives. The so-formed suspensions can be used for dipping, spraying or painting. However, such suspensions have a short pot life and usually must be used within a few minutes after preparation. This has been a deterrent to some applications of these fluid compositions. The term "pot-life" is used to indicate the time which a fluid dispersion can remain at ambient temperatures, say from 15 to 30° C., without becoming so gelatinous or so viscous that the utility of dipping, spraying and the like is seriously impaired.

It is, therefore, an object of the invention to provide fluid adhesive cements comprising boric oxide dispersed in a polymer of a polymerizable heterocyclic nitrogen base having increased pot life. Other objects, as well as aspects and advantages, of the invention will become apparent from a study of the accompanying disclosure.

According to the invention, there is provided a composition comprising a fluid adhesive cement containing boric oxide dispersed in a polymer of a polymerizable heterocyclic nitrogen base as essential adhesive ingredients, and containing a nitrogen compound selected from the group consisting of pyridine, quinoline, isoquinoline, and one of the foregoing nitrogen compounds containing any number of aliphatic radicals selected from the group consisting of saturated and unsaturated aliphatic radicals substituted for available nuclear hydrogen atoms of said nitrogen compound, the total number of carbon atoms in the total of said aliphatic groups not exceeding 20 carbon atoms and the total number of carbon atoms in any one aliphatic group not exceeding 12 carbon atoms.

By the practice of this invention, the pot life of such fluid adhesive cements can be increased from a few minutes for unstabilized cement to several days and even several weeks for the stabilized cement. The solutions, even after aging, have proved to be excellent for forming bonds between metals, plastics, rubber, wood, etc.

The invention is applicable to any fluid adhesive cement comprising boric oxide dispersed in a polymer of a polymerizable heterocyclic nitrogen base as essential adhesive ingredients. The boric oxide improves the adhesive properties of the polymer. The invention is particularly advantageous with the boric oxide-heterocyclic nitrogen base polymer compositions disclosed and claimed in copending application Serial No. 666,232, filed June 17, 1957, by Herbert R. Anderson, Jr. Thus, a particularly important group of polymeric materials suitable for use in the preparation of the stabilized adhesive compositions of this invention are polymer products prepared by polymerization of as little as one part to as much as 70 parts by weight of an unsubstituted monovinylpyridine, alkyl-substituted monovinylpyridine, unsubstituted monovinylquinoline or alkyl-substituted monovinylquinoline with from 99 to 30 parts by weight of other monomers copolymerizable with the nitrogen base, based on 100 parts total polymerizable monomers. Such polymers range from liquid to rubbery products.

The heterocyclic nitrogen base monomers generally preferred are those having not more than 12 carbon atoms in the nuclear-substituted groups other than vinyl or alpha-methylvinyl. Examples of such monomers include: 2-vinylpyridine; 4-vinylpyridine; 2,4,6-trimethyl-5-vinylpyridine; 3,4,5,6 - tetramethyl-2-vinylpyridine; 3-ethyl-5-vinylpyridine; 2-vinyl-5-ethylpyridine; 2-methyl-5-vinylpyridine; 4,6-dimethyl-2-vinylpyridine; 2,6-diethyl-4-vinylpyridine; 2-isopropyl-4 - vinylpyridine; 2-vinyl-5-ethylpyridine; 2-vinyl-5-propylpyridine; 2-vinyl-5-butylpyridine; 2-vinyl-5-hexylpyridine; 2-vinyl-5 - heptylpyridine; 2-methyl-5-undecyl-6-vinylpyridine; 2,4 - dimethyl-5,6-dipentyl-3 - vinylpyridine; 2 - methyl - 3,5 - di(alpha-methylvinyl)pyridine; 2-vinylquinoline; 2-vinyl-8 - ethylquinoline; 4-hexyl-5-vinylquinoline; 4-dodecyl - 5 - vinylquinoline; 3,4,5,6-tetramethyl-2-vinylquinoline; 1-vinylisoquinoline; 5-methyl-1-isopropenylisoquinoline, and the like.

Monomers copolymerizable with these heterocyclic nitrogen bases include compounds containing an active $CH_2=C<$ group. Such compounds include styrene; substituted styrenes such as alkyl, alkoxy and halogen-substituted styrenes; acrylonitrile; methacrylonitrile; methyl acrylate; methyl methacrylate; ethyl acrylate; butyl acrylate; 1,3-butadiene; isoprene; piperylene; methylpentadiene; 2,3-dimethyl-1,3-butadiene; and chloroprene.

Polymers can be prepared from mixtures of the heterocyclic nitrogen bases with one or more of the type of monomers described. A polymer of 2-vinylpyridine, 2-methyl-5-vinylpyridine, acrylonitrile, and 1,3-butadiene is a specific example of this type.

Broadly stated, the polymers employed as starting materials can be prepared by various methods known to the art, including mass and emulsion polymerization. Broadly, the polymers range from liquid to rubbery materials, the viscosity range being from 100 Saybolt Furol Seconds at 100° F. to a Mooney (ML-4) value of 150. A particularly useful class of polymers are rubbery polymers wherein a major amount of monomers comprise 1 or more conjugated diolefins. For such polymers, I prefer polymers prepared by polymerizing 3 to 25 parts by weight of the vinyl-substituted heterocyclic nitrogen base and at least 50 parts by weight of a conjugated diene per 100 parts total monomers. This class of rubbery polymers includes terpolymers containing up to 25 percent of a comonomer containing a single vinylidene group such as styrene; for example, such comonomers as are set forth in the description hereinbefore of the copolymerizable monomers. A specific example of such a rubbery terpolymer is one prepared by polymerizing 2-methyl-5-vinylpyridine, 1,3-butadiene and acrylonitrile.

The boric oxide employed in the practice of this invention has the chemical formula $B_2O_3$. For convenience, the boric oxide is used preferably in the form of the powder to facilitate blending with the polymer or other compounding ingredients. It is preferred that the boric oxide have a moisture content of less than 10 percent of water by weight, as determined by drying at 200° F. in a vacuum oven. Boric acid does not give improved adhesion. Sodium metaborate likewise gives no improvement in adhesion.

The boric oxide is used preferably in amounts from 5 to 100 parts by weight per 100 parts of polymer, larger amounts being employed as the nitrogen content of the polymer increases. The boric oxide can be used alone or in admixture with carbon black or other pigments, fillers, such as clay, silica, titanium dioxide and alumina. The boric oxide can be used alone but is often preferred to include other compounding ingredients to prepare a suitable adhesive stock.

Various methods of producing the stabilized compositions of this invention can be employed. In one method, the heterocyclic nitrogen base stabilizer is mixed with a suitable solvent for the polymer such as benzene, toluene, xylene, cyclohexane, chloroform, carbon tetrachloride, dimethylformide, mixtures thereof, etc. Usually the solvent employed has a boiling point below 400° F., although higher boiling solvent can be used. To the suspension resulting, the boric oxide, other curatives, if employed, such as sulfur, antioxidants, accelerators and the like are added and a blend or dispersion is produced by milling, stirring or the like. The polymer or a solution of the polymer is then blended with the dispersion so that a suspension of the desired composition and fluidity is obtained. In another method, the polymer is dissolved in the solvent which contains the stabilizing agent dispersed therein, and the boric oxide and other ingredients, if employed, such as antioxidant, etc., are blended into the polymer solution. When using a liquid polymer, the solvent can be omitted, if desired, and the stabilizer containing the boric oxide can be blended into the liquid polymer. A less desirable method for preparing the fluid adhesive cement composition when employing a rubbery polymer is to blend the boric oxide, the stabilizer and the polymer on a cooled rubber mill or an internal mixer, such as a Banbury mixer, and then dissolve the resulting polymer composition in a solvent for the polymer.

In the practice of this invention, relatively small amounts of the stabilizer produce a beneficial effect. Usually there is employed about 1 to about 100 parts by weight, preferably from about 5 to about 50 parts of stabilizer per 100 parts by weight of polymer in the formulation. In some cases, the amounts employed when employing the higher ratios set forth are considerably in excess in the requirements for stabilization, the excess serving as a solvent for the adhesive.

The stabilized fluid adhesive compositions of this invention range from relatively non-viscous suspensions having viscosities in the 1 to 20 centipoises range to relatively viscous, thick fluids. Fluids which are relatively free-flowing are preferred for most applications. The viscosity can be adjusted, for instance, by increasing or decreasing the amount of solid polymer in relation to the solvent, or in some cases by adjusting the amount of the stabilizer. The amount of solvent employed in the compositions can be greatly varied depending upon the particular application for which the adhesive is produced, the particular solvent, the particular copolymer, etc., as will be understood, but in general from 2.5 to 200 parts by weight of solvent per 1 part by weight of polymer is employed in the case of a rubbery polymer. In the case of liquid polymers, the amount of solvent can be whatever small amount will produce the viscosity of adhesive desired, and, as before mentioned the solvent can be entirely omitted when it is not needed. Also, if desired, even in the case of a rubbery polymer, the solvent can be partly or entirely omitted while using an amount of stabilizing agent in excess of that required for stabilization as a solvent for the composition.

Examples of the defined heterocyclic nitrogen compound stabilizers applicable in accordance with this invention are 2-methylpyridine; 3-methylpyridine; 4-methylpyridine; 2,6-dimethylpyridine; 2,4,6-trimethylpyridine; 2-ethylpyridine; 3-ethylpyridine; 4-ethylpyridine; 2,6-diethylpyridine; 2,4,6-triethylpyridine; 2-methyl-5-ethylpyridine; 2-methyl-6-ethylpyridine; 2-vinylpyridine; 4-vinylpyridine; 2,4,6-trimethyl-5-vinylpyridine; 3,4,5,6-tetramethyl-2-vinylpyridine; 3-ethyl-5-vinylpyridine; 2-vinyl-5-ethylpyridine; 2-methyl-5-vinylpyridine; 4,6-dimethyl-2-vinylpyridine; 2,6-diethyl-5-vinylpyridine; 2-isopropyl-4-vinylpyridine; 2-vinyl-5-(ethylvinyl)pyridine; 2-vinyl-5-propylpyridine; 2-vinyl-5-butylpyridine; 2-vinyl-5-hexylpyridine; 2-vinyl-5-heptylpyridine; 2-methyl-5-undecyl-6-vinylpyridine; 2,4-dimethyl-5,6-dipentyl-3-vinylpyridine; 2-methyl-3-5-di(alpha-methylvinyl)pyridine; 2-vinylquinoline; 2-methyl-8-ethylquinoline; 2-vinyl-8-ethylquinoline; isoquinoline; 1-vinylisoquinoline; 1-methylisoquinoline; 5-methyl-1-isopropenylisoquinoline; 2-n-butyl-4-hexylpyridine; 2-dodecyl-5-n-octylpyridine; 2-decyl-5,6-isobutylpyridine; 2-ethyl-5-heptylpyridine; 2-methyl-5-undecyl-6-ethylpyridine; quinoline; 2-methyl-6-n-octyl-8-isobutylquinoline; 1-dodecylisoquinoline; 1-ethylisoquinoline; 5-ethyl-1-hexadecylisoquinoline; and the like.

The following examples are merely illustrative of the invention and should not be interpreted as limiting.

EXAMPLE I

A. *Polymerization of the polymer.*—A 75/25 copolymer of 1,3-butadiene and 2-methyl-5-vinylpyridine was prepared by emulsion polymerization at 41° F. using the following recipe:

| | Parts by weight |
|---|---|
| Water | 180 |
| 1,3-butadiene | 75 |
| 2-methyl-5-vinylpyridine | 25 |
| Potassium fatty acid soap | 6.0 |
| KOH | 0.1 |
| KCl | 0.1 |
| Sodium salt of condensed alkyl aryl sulfonic acid | 0.3 |
| $K_4P_2O_7$ | 0.096 |
| $FeSO_4 \cdot 7H_2O$ | 0.083 |
| Cumene hydroperoxide | 0.050 |
| Tert-dodecyl mercaptan | 0.27 |

After a reaction time of 14.5 hours, the reaction was short-stopped at a conversion of 60 percent. The polymer was coagulated, dried and used for the tests described below.

B. *Preparation of polymer solution.*—Weighed amounts of the polymer were dissolved in benzene to give a solution containing 10 percent by weight of the polymer. This solution was used in conjunction with the boric oxide suspensions described below. In all cases, sufficient boric oxide suspension was taken to give 50 parts by weight of boric oxide per 100 parts of rubber.

C. *Preparation of boric oxide dispersions.*—Boric oxide dispersions, herein designated as dispersion A and B, were prepared by milling the following ingredients in a ball mill (about 500 ml. capacity) for about two hours.

| | Parts by Weight | |
|---|---|---|
| | A | B |
| Boric oxide | 15 | 1.67 |
| Sulfur | 0.52 | 0.0583 |
| Santocure | 0.30 | 0.033 |
| Zinc oxide | 0.90 | 0.10 |
| Benzene | 68.3 | 11.5 |
| Stabilizer [1] | variable | variable |

[1] Determined by difference from the value found for the percent solids (24.5%) determined by drying a sample of the dispersion at 100° C.
[2] Pyridine or 2-methyl-5-ethylpyridine.

The stabilizers used in variable amounts, as indicated in the table were blended with these dispersions prior to use with the rubber solution. The pyridine and the 2-methyl-5-ethylpyridine blended readily with the suspensions. For the series of tests made with dispersion A, 30 grams of rubber solution was mixed with 8.50 grams of the dispersion to which the desired amount of stabilizer was added.

at a fixed rate and determining the maximum force in p.s.i. which was attained during stretching of the joint.

The results of the various shear tests which were made are summarized in Table I. This table also reports values for the pot life. These values were obtained by periodic observations of samples of the adhesive compositions. The pot life is defined as the time for the suspensions to become gelatinous or very viscous.

*Table 1*

ADHESIVE COMPOSITIONS COMPRISING POLYMER AND BORIC OXIDE

| Stabilizer | | Stabilizer dispersion used | Pot Life | Adhesion in Shear,[1] p.s.i. | | | |
|---|---|---|---|---|---|---|---|
| Compound | Parts/100 polymer | | | Steel to Steel | | Polyethylene interlayer | |
| | | | | (a) | (b) | (a) | (b) |
| None | 0 | none | <5 min | 1,215 | | 1,110 | |
| None | 0 | none | <5 min | 2 520 | | 950 | |
| 2-Methyl-5-ethylpyridine | 12.5 | B | 2 hours | | | 870 | |
| 2-Methyl-5-ethylpyridine | 20 | A | >1 week | 740 | 810 | 880 | 950 |
| 2-Methyl-5-ethylpyridine | 25 | B | >16 hours | 1,100 | | 980 | |
| Pyridine | 13.1 | A | >1 week | 770 | | 1,110 | 1,030 |

[1] The values under the columns headed with (a) were obtained with freshly prepared cement. The values under (b) were obtained with cement dispersions which had aged 2 days prior to use.
[2] After the shear test it was observed that the joint had insufficient adhesive.

For tests made with dispersion B, 33.3 grams of rubber solution was used with 13.36 grams of dispersion B. Thus, in all cases, the weight ratio of polymer to boric oxide was 2:0. In terms of parts per 100 parts of rubber, the adhesive compositions can be expressed by the recipe:

| | Parts |
|---|---|
| Polymer | 100. |
| Boric oxide | 50. |
| Sulfur | 1.75. |
| Santocure | 1.0. |
| Zinc oxide | 3.0. |
| Stabilizer | variable. |
| Benzene | 1128 for dispersion A. / 1244 for dispersion B. |

D. *Shear strength tests.*—Mild steel strips (20 gauge) which were 4 inches long and 1 inch wide were cleaned by etching in a solution prepared with 5 parts by volume of 36 N HNO₃ and 100 parts by volume of 98 percent ethanol. These strips were used to fabricate lapped joints having an area of one square inch.

For the joints herein designated as a steel-to-steel joint, the adhesive compositions were brushed on the surfaces to be coated. Four coats were applied, each coat being allowed to air dry before application of the next coat. The lap joints were cured at 307° F. for 30 minutes while applying a pressure on the order of 500 p.s.i. In this manner, a joint was formed having a thin (about 5 to 10 mil thickness) adhesive layer.

For the joints herein designated as having a polyethylene innerlayer, two coats of the adhesive cement were brushed onto the steel strips which were air dried and were then dipped into a 10 percent solution of hydrogenated polybutadiene in trichloroethylene and dried. The steel strips were then assembled with an inner layer of a film of high density solid polyethylene of about 1 mil thickness. The joint was formed and cured at about 307° F. for 30 minutes, while applying only sufficient pressure to assure good contact.

Some joints were made with the adhesives immediately after mixing the rubber solution with the boric oxide suspensions. For other tests the resulting mixture was aged two days before use to establish that the adhesive compositions did not deteriorate upon storage.

The shear strength of the joints were determined by placing the strips in tension, i.e., pulling on each strip The results in Table I show that by practice of this invention, the pot life can be increased from a value of less than 5 minutes to a week and even longer. The adhesive composition can be used immediately after mixing or after prolonged aging. The strength of the joints formed are not impaired by addition of the stabilizer.

As will be evident to those skilled in the art, various modifications of this invention can be made or followed in the light of the foregoing disclosure and discussion without departing from the spirit or scope of the disclosure or from the scope of the claims.

I claim:

1. In a fluid adhesive composition comprising a fluid adhesive cement containing boric oxide dispersed in a polymer of a monomer selected from the group consisting of an unsubstituted monovinylpyridine, an alkyl-substituted monovinylpyridine containing not more than 12 carbon atoms in alkyl-substituent groups, an unsubstituted monovinylquinoline and an alkyl-substituted monovinylquinoline containing not more than 12 carbon atoms in alkyl-substituent groups as essential adhesive ingredients, the improvement which consists of adding to the fluid adhesive cement a nitrogen compound selected from the group consisting of: (1) pyridine, (2) quinoline, (3) isoquinoline, and (4) one of the foregoing nitrogen compounds having any number of the nuclear hydrogen atoms of said nitrogen compound replaced by an aliphatic radical selected from the group consisting of saturated and unsaturated aliphatic hydrocarbon radicals, the total number of carbon atoms in the total of said aliphatic groups not exceeding 20 carbon atoms and the total number of carbon atoms in any one aliphatic group not exceeding 12 carbon atoms.

2. In a fluid adhesive composition comprising a fluid adhesive cement containing boric oxide dispersed in a polymer resulting from the polymerization of from 1 to 70 parts by weight of a monomer selected from the group consisting of an unsubstituted monovinylpyridine, an alkyl-substituted monovinylpyridine containing not more than 12 carbon atoms in alkyl-substituent groups, an unsubstituted monovinylquinoline and an alkyl-substituted monovinylquinoline containing not more than 12 carbon atoms in alkyl-substituent groups with from 99 to 30 parts by weight of another monomer containing an active CH₂=C< group as essential adhesive ingredients, the improvement which consists of adding to the fluid adhesive cement a nitrogen compound selected from the group consisting of: (1) pyridine, (2) quinoline, (3) isoquinoline, and (4) one of the foregoing nitrogen compounds having any number of the nuclear hydrogen atoms of said nitrogen compound replaced by an aliphatic radical selected from the group consisting of saturated and unsaturated aliphatic hydrocarbon radicals, the total number of carbon atoms in the total of said aliphatic groups not exceeding 20 carbon atoms and the total number of carbon atoms in any one aliphatic group not exceeding 12 carbon atoms.

3. A composition of claim 1 wherein said polymer is a polymer resulting from polymerizing 3 to 25 parts by weight of said monomer with at least 50 parts by weight of a conjugated diene per 100 parts by weight of total monomers.

4. A composition of claim 3 wherein said polymer results from the interpolymerization of said monomer, said conjugated diene and up to 25 weight percent of a comonomer containing a single vinylidene group.

5. A composition of claim 2 wherein said adhesive cement contains a solvent for said polymer selected from the group consisting of benzene, toluene, xylene, cyclohexane, chloroform, carbon tetrachloride and dimethylformamide.

6. A composition of claim 3 wherein said adhesive cement contains a solvent for said polymer selected from the group consisting of benzene, toluene, xylene, cyclohexane, chloroform, carbon tetrachloride and dimethylformamide.

7. A composition of claim 4 wherein said polymer is an interpolymer of 2-methyl-5-vinylpyridine, 1,3-butadiene and acrylonitrile.

8. A composition of claim 3 wherein said polymer is an interpolymer of 2-methyl-5-vinylpyridine and 1,3-butadiene.

References Cited in the file of this patent

UNITED STATES PATENTS

| | | |
|---|---|---|
| 2,136,788 | Fairlie | Nov. 15, 1938 |
| 2,422,153 | Nimwegen et al. | June 10, 1947 |
| 2,530,774 | Kehe et al. | Nov. 21, 1950 |
| 2,619,445 | Kalafus | Nov. 25, 1952 |
| 2,748,097 | Niederhauser | May 29, 1956 |